United States Patent [19]

Takaku et al.

[11] Patent Number: 4,518,560
[45] Date of Patent: May 21, 1985

[54] RAIL APPARATUS AROUND NUCLEAR REACTOR PRESSURE VESSEL AND METHOD OF INSTALLING THE SAME

[75] Inventors: Kazuo Takaku; Akisuke Naruse; Hirotsugu Fujimoto; Hiroshi Kimura, all of Hitachi, Japan

[73] Assignees: Hitachi, Ltd., Tokyo; Hitachi Engineering Co., Ltd., Hitachi, both of Japan

[21] Appl. No.: 435,349

[22] Filed: Oct. 20, 1982

[30] Foreign Application Priority Data

Oct. 21, 1981 [JP] Japan .................. 56-168375

[51] Int. Cl.³ ............................. G21C 17/00
[52] U.S. Cl. ....................... 376/245; 376/249; 376/260
[58] Field of Search ............. 376/249, 260, 287–291, 376/245

[56] References Cited

U.S. PATENT DOCUMENTS

| 4,299,656 | 11/1981 | Weber et al. | 376/249 |
| 4,336,104 | 6/1982 | Figlhuber et al. | 376/249 |
| 4,416,846 | 11/1983 | Kastl et al. | 376/249 |
| 4,429,329 | 1/1984 | Clemens et al. | 376/249 |

FOREIGN PATENT DOCUMENTS

| 2506415 | 8/1976 | Fed. Rep. of Germany | 376/249 |
| 2609541 | 9/1977 | Fed. Rep. of Germany | 376/249 |
| 2620715 | 11/1977 | Fed. Rep. of Germany | 376/249 |
| 2709023 | 9/1978 | Fed. Rep. of Germany | 376/249 |
| 2834108 | 12/1979 | Fed. Rep. of Germany | 376/249 |
| 57-16350 | 1/1982 | Japan | 376/249 |

Primary Examiner—Sal Cangialosi
Attorney, Agent, or Firm—Beall Law Offices

[57] ABSTRACT

A rail apparatus for running an automatic ultrasonic flaw detector around a reactor pressure vessel for detecting any flaw in the weld beads on the reactor pressure vessel. At least two circumferential rails and vertical rails are connected through turn tables at their crossing points to form a rail unit. The rail unit has vertical rails extending upward from the uppermost circumferential rail. The vertical rails are secured to a gamma shield, so that the rail unit as a whole is suspended from the gamma shield by means of these vertical rails. The rail unit is provided with swing prevention devices for preventing swing thereof. In installation of the rail apparatus, the rail unit is temporarily mounted on the reactor pressure vessel before mounting the latter in a containment vessel. Then, after accurately placing the reactor pressure vessel together with the rail unit in a right place within the containment vessel, the rail unit is supported suitably by the gamma shield.

12 Claims, 14 Drawing Figures

RAIL APPARATUS AROUND NUCLEAR REACTOR PRESSURE VESSEL AND METHOD OF INSTALLING THE SAME

BACKGROUND OF THE INVENTION

The present invention relates to a rail apparatus for an inspection device for inspection around a nuclear reactor pressure vessel (referred to as "RPV", hereinunder), as well as to a method of installing the rail apparatus around the RPV.

DESCRIPTION OF THE PRIOR ART

Generally, an RPV is composed of a plurality of plates which are connected to one another by welding. In order to check whether the RPV exhibits an expected performance, an inspection or examination of weld parts is made periodically even after the RPV is put into use.

The inspection of the weld parts is made by, for example, an inspection device such as an ultrasonic flaw detector. For making the inspection of the weld parts of the RPV, it is necessary to move the inspection device around the RPV along the weld parts.

It is known to install a rail apparatus along the weld parts on the RPV and to make the inspection device run along the rail apparatus. An example of such a rail apparatus is disclosed in, for example, Japanese Patent Laid-open Publication No. 72591/1973.

This known apparatus, however, employs only vertical rails laid along the weld parts extending in the longitudinal direction of the RPV in order to permit the smooth mounting of the inspection device. This known apparatus, however, does not employ any circumferential rail extending along the circumferential weld parts of the RPV, due to difficulty in mounting the inspection device on the rail.

In addition, the carrying and installation of the rail apparatus are made after the installation of the RPV into a containment vessel.

SUMMARY OF THE INVENTION

Accordingly, it is an object of the present invention to provide a rail apparatus which can guide an inspection device along the weld parts extending in both the longitudinal direction of the RPV and in the circumferential direction of the RPV. The rail apparatus has a simple construction and is free from any influence of thermal expansion due to temperature change.

Another object of the present invention is to provide a method of installing the rail apparatus around the RPV, which can facilitate the carrying in and the installation of the rail apparatus into the containment vessel while attaining a high precision of installation.

To these ends, according to the present invention, there is provided a rail apparatus around RPV comprising vertical rail members supported by supporting members which are fixed at their one ends to a gamma shield member disposed outside of the RPV, and at least one circumferential rail member connected to and united with the vertical rail members through turn tables, the vertical and circumferential rail members being retained by the gamma shield member through swing prevention members.

If the above-stated rail apparatus is to be installed on the RPV after the carrying in of the RPV into the containment vessel and installation of the RPV in a predetermined position, it is necessary to divide the rail apparatus into a plurality of sections so as to permit an easy installation of the rail apparatus while avoiding interference between the nozzles attached to the RPV and the rail members. To obviate this predicted problem, according to the present invention, the rail members of the rail apparatus are temporarily mounted on the RPV before carrying the RPV into the containment vessel. After carrying the RPV and the rail apparatus as a unit into the containment vessel, the rail members are connected to the gamma shield members thereby to complete the installation of the rail apparatus of the invention. The reason why the mounting of the rail members on the RPV is not permanent, but temporary is that it is not allowed to attach the rail members to the RPV during the use of the latter.

These and other objects, features and advantages of the present invention will become clear from the following description of the preferred embodiments taken in conjunction with the accompanying drawings:

DESCRIPTION OF THE PREFERRED EMBODIMENTS

Figure 1:
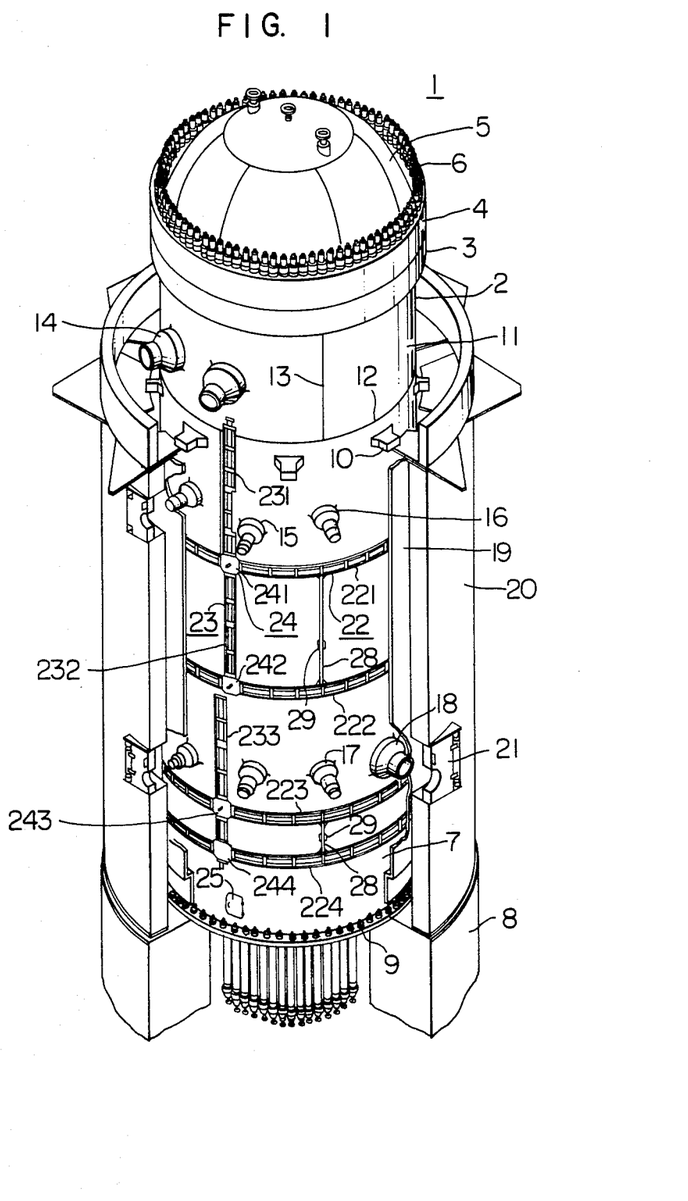
FIG. 1 is a partly cut-away perspective view of an RPV provided with a rail apparatus in accordance with the present invention, together with associated equipment.

FIG. 1 shows an RPV of a boiling water reactor (BWR) installed within a containment vessel. As will be seen from this Figure, the RPV 1 has a cylindrical barrel 2, a hemispherical lower end portion (not shown) welded to the lower end of the barrel 2, a flange 3 welded to the upper end of the barrel 2, and an upper end portion 5 having a flange 4. The upper end portion 5 is coupled at its flange 4 to the flange 3 by means of stud bolts 6 thereby to form a sealed vessel. A skirt 7 is welded to the lower end portion of the RPV 1. The RPV 1 is mounted at the skirt 7 on a pedestal 8 by means of bolts 9. In order to prevent an overturn of the RPV 1, the RPV 1 is provided with stabilizer brackets 10 which are connected to the wall of the containment vessel (not shown) through stabilizers (not shown). Two tube halves are welded to each other to form a tubular block 11. The blocks 11 are stacked and welded to each other to form the barrel portion 2. There are five circumferential beads 12 spaced in the longitudinal direction in the embodiment shown in FIG. 1. Vertical beads 13 are formed in symmetry with respect to the axis of the barrel portion in each block. The positions of the vertical beads 13 are circumferentially offset in adjacent blocks. The circumferential offset of the vertical beads 13 is about 300 mm.

The barrel portion 2 is provided with a main steam nozzle 14, a reactor core spray nozzle 15, a water feed nozzle 16, a recycle water inlet nozzle 17 and a recycle water outlet nozzle 18. The barrel portion is surrounded by a heat insulating wall 19 which in turn is surrounded by a gamma shield 20 provided with openings 21 for nozzles.

To permit an inspection device to be moved to the positions where the inspection is to be made, a rail apparatus is installed between the barrel 2 and the heat insulating wall 19. The rail apparatus includes circumferential rails 221 to 224 extending along the circumferential beads 12 and vertical rails 231 to 234 extending along the vertical beads 13.

A radial gap of about 200 mm is left between the outer peripheral surface of the barrel portion 2 and the inner peripheral surface of the heat insulating wall 19. In order that the inspection device can smoothly run through this gap, the overall height of the inspection device including the rail height should not be greater than 200 mm. Since both of the heat insulating wall 19 and the gamma shield 20 have cylindrical forms devoid of any opening large enough to permit the inspection device to be moved therethrough, the inspection device has to be placed into the annular space around the barrel portion 2 through either axial end portion of the barrel portion 2. Furthermore, in order to avoid interference with the nozzles 15 to 18 and with the brackets 10 on the barrel portion 2, the inspection device has to be inserted into position axially only along one of the vertical beads 13 on which neither nozzles nor brackets can be provided. In the described embodiment of the present invention, therefore, the mounting of the inspection device on the rail apparatus is made at the upper end of the vertical rail 231. The inspection device can move back and forth freely on the circumferential rails 221 to 222 and other vertical rails through the turn tables. In the illustrated embodiment, rails are laid neither along the uppermost circumferential bead nor along the uppermost vertical bead. Namely, since these beads are away from the reactor core and subjected to smaller exposure dosage and these beads are not surrounded by the heat insulating wall and a gamma shield, these beads are readily inspected without aforementioned remote inspection, so that no rail is provided around the uppermost portion of the RPV.

In order to attain higher efficiency of inspection, the rail apparatus is divided into an upper system and a lower system. The mounting of the inspection device on the lower system is made at the turn table 244. The inspection device is inserted from a bottom of the RPV into the space between the barrel 2 and the heat insulating wall 19 through a manhole 25 provided in the skirt 7 and mounted on the turn table 244.

Figure 2:
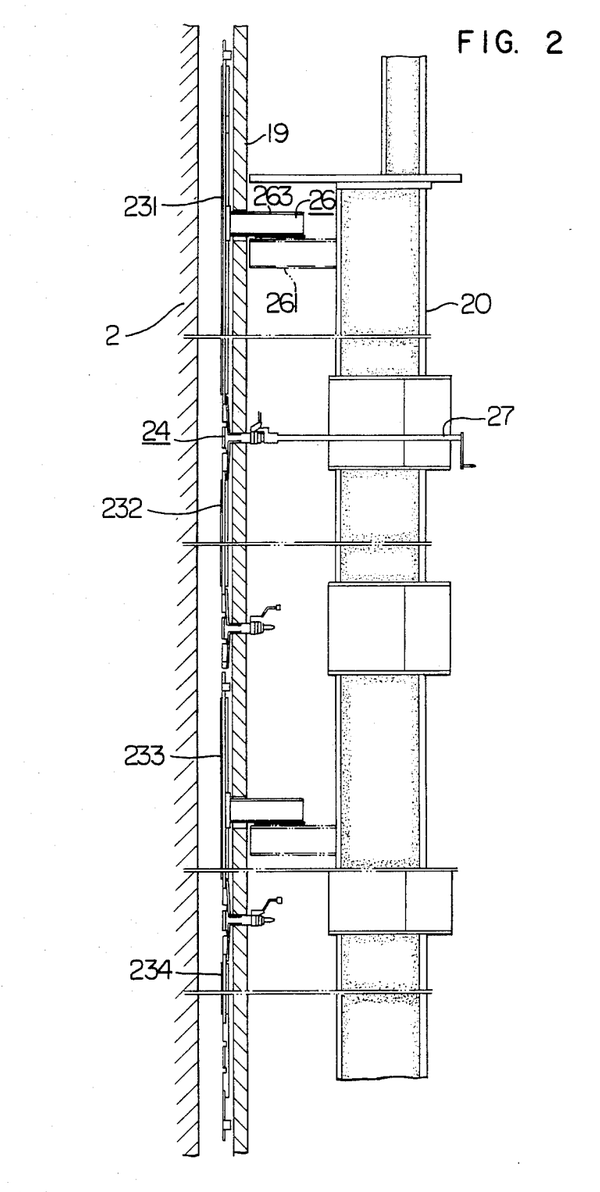
FIG. 2 is a fragmentary vertical sectional view of the RPV shown in FIG. 1.
Figure 4:
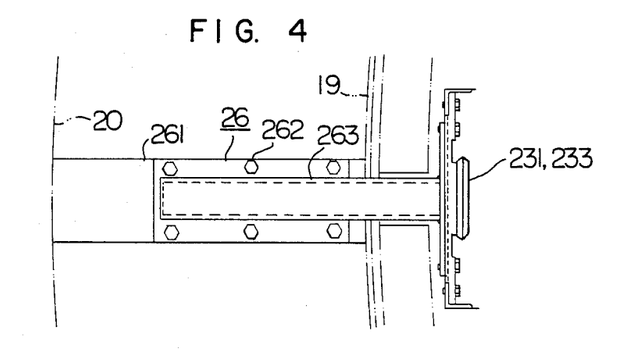
FIGS. 4 and 5 are a top plan view and a side elevational view of a fixing bracket respectively.
Figure 5:
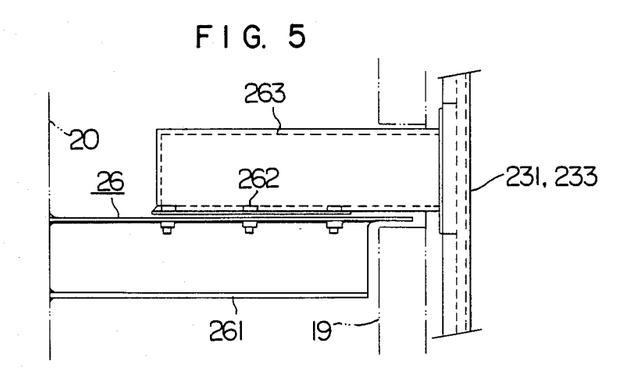

FIG. 2 shows the detail of the vertical rails 231 to 234 disposed between the barrel portion 2 of the RPV 1 and the gamma shield 20. The vertical rails 231 and 232 are connected to each other through a turn table 241 to form a continuous line. As stated before, the vertical beads 13 are disposed in symmetry with respect to the axis in each block and the vertical beads 13 are circumferentially offset about 300 mm in adjacent blocks. This does not matter because the probe of the inspection device can circumferentially move about 300 mm at each side. Namely, the probe can cover the circumferential width of about 600 mm centered at the position of the inspection device. Two vertical rails 231 arranged in symmetry with respect to the axis are supported by the gamma shield 20 by means of fixing members 26. As shown in FIGS. 4 and 5, the fixing member 26 is composed of a beam 261 one end of which is fixed to the gamma shield 20 and a connecting pillar 263 fastened to the beam 261 by means of bolts 262. The connecting pillar extends through the heat insulating wall 19 to the vertical rail 231. The vertical rail 233 is also fixed to and supported by the gamma shield 20 in the same manner.

Figure 3:
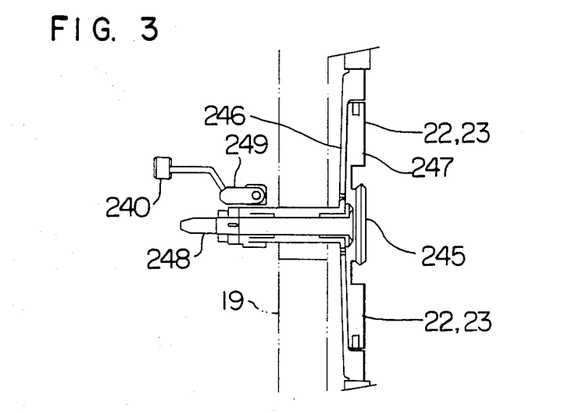
FIG. 3 shows the detail of the turn table shown in FIG. 2.

FIG. 3 shows the detail of the turn table means 24. The turn tables constituting the turn table means are provided to every point of crossing between the vertical rails 231 to 234 and circumferential rails 221 to 224. The turn table has a turret 247 carrying a rail segment 245. As the inspection device coming along a rail is moved onto the rail segment 245, the rail segment 245 is turned by the turret 247 into alignment with another rail to permit the inspection device to move onto another rail. The turn table further has a housing 246 which rotatably holds the turret 247 and provides a rigid connection between the vertical rail and the circumferential rail at each of the crossing points between the vertical rails 231 to 234 and the circumferential rails 221 to 224. The turret 247 has a drive shaft 248 which extends through the heat insulating wall 19. The drive shaft 248 is provided with a cross-shaped claw 249 adapted to stop the rotation of the turret 247 through engagement with the stopper 240 on the housing 246. When the operator intends to rotate the turn table, a handle 27 is strongly pulled from the outside of the gamma shield 20 as shown in FIG. 2 to disengage the stopper 240 and then rotated to turn the turn table.

Figure 6:
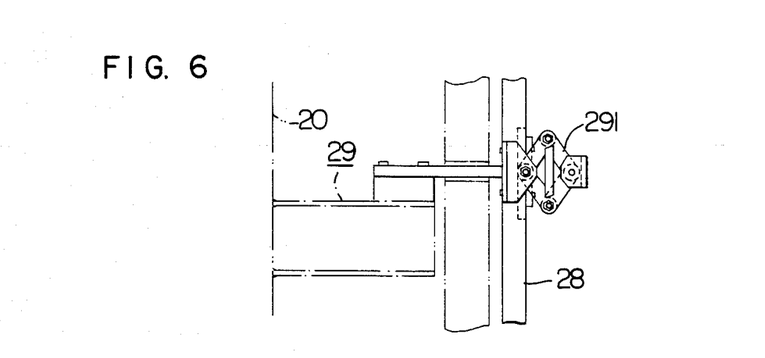
FIG. 6 shows the detail of a rail retaining portion having a swing prevention function.

Thus, the vertical rail means 23 and circumferential rail means 22, divided into the upper and lower systems, are united through turn tables, and are supported by the gamma shield 20 through the vertical rails 231 and 233 which are not restrained at their upper portions by the circumferential rails. According to this arrangement, it is possible to absorb the thermal expansion and contraction of the circumferential rails by the deflection of the vertical rails 231 and 233 since the circumferential rails are not supported by the gamma shield directly. The rail apparatus is merely suspended at two points by the gamma shield, so that the rail apparatus may be unfavourably swung by an earthquake or the like. To prevent the swing of the rail apparatus, according to the present invention, a connecting rod 28 is interposed between two adjacent circumferential rails and is connected to the gamma shield 20 through a supporting device 29 having an expansion mechanism 291. Thus, the supporting device 29 serves as a swing prevention device for preventing the swing of the rail apparatus.

A detailed description will be made hereinunder as to how the rail apparatus of the invention is situated on the RPV.

(1) Preparation for installation

Circumferential rails 221 and 222 and vertical rail 232 are assembled and united through turn tables 241 and 242. Similarly, circumferential rails 223 and 224 and vertical rail 234 are assembled together and united through turn tables 243 and 244. These assemblies from independent ring-shaped rail units.

(2) Temporary installation

Figure 7A:
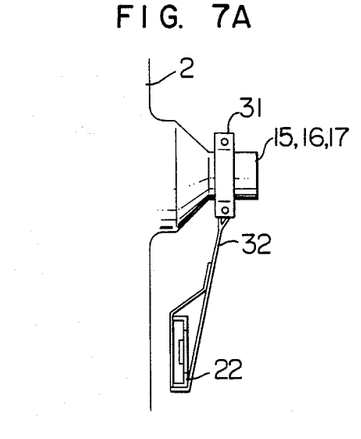
FIGS. 7A, 7B, 8A and 8B illustrate the temporary mounting states of the rail apparatus onto the RPV.
Figure 7B:
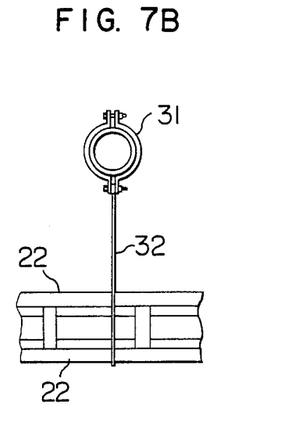
Figure 8A:
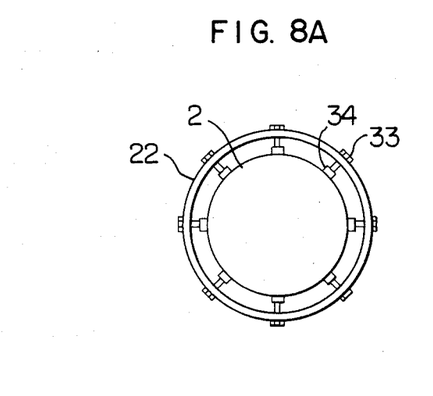
Figure 8B:
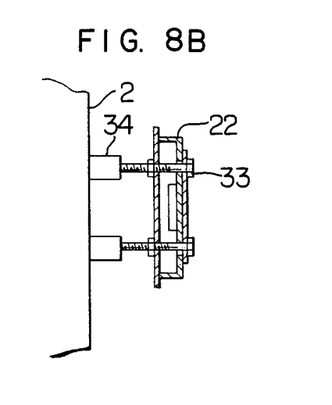

The ring-shaped rail units thus assembled are temporarily installed on the outer periphery of the barrel 2 of the RPV. The temporarily installed circumferential rails are temporarily held by jigs 31 and wire ropes 32 in a manner shown in FIGS. 7A and 7B in order to prevent any offset of the rail units during lifting and carrying of the RPV explained later, and are temporarily fixed by means of adjust bolts 33 and the protection members 34 provided on the entire circumference of the rail means 22.

(3) Lifting and carrying of the RPV

Figure 9:
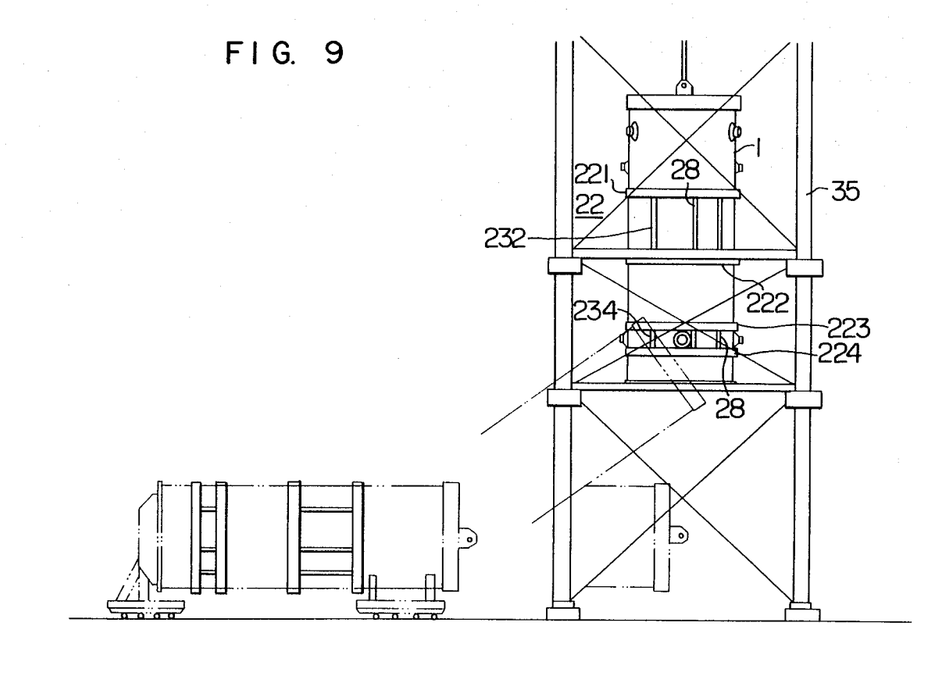
FIGS. 9 and 10 show how the RPV is carried into a containment vessel.
Figure 10:
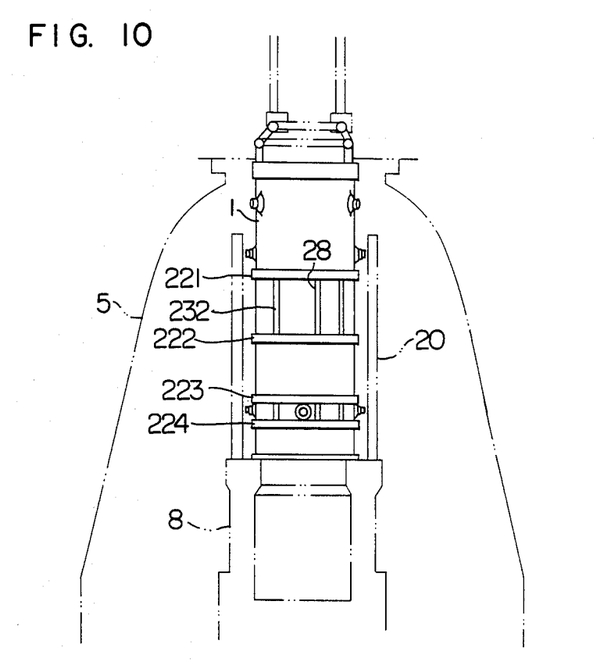

The RPV 1, to which the rail units are attached as described, is then transported to a lifting device 35 by a known method as shown in FIG. 9 and is lifted by the device 35 and inserted into the gamma shield 20 in a manner shown in FIG. 10.

(4) Attaching of supporting device

Brackets 36 for temporary support, as well as supporting devices 26 and 29 for supporting the rails and for preventing swing thereof are attached to the gamma shield 20.

(5) Adjustment of position of rail unit

Figure 11:
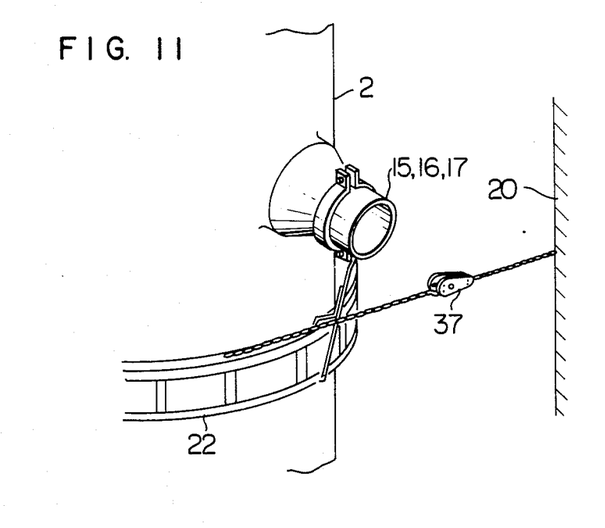
FIGS. 11 and 12 illustrate the way of adjustment of position of the rail apparatus.
Figure 12:
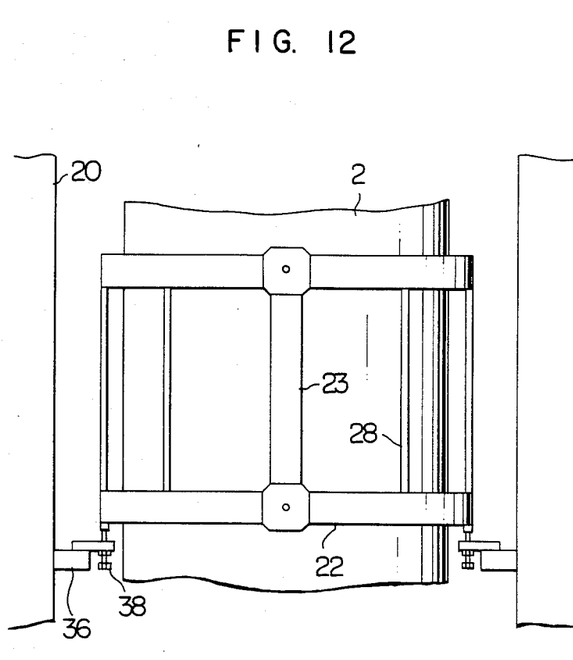

The circumferential position of the rail unit is adjusted by means of a chain block 37 in a manner shown in FIG. 11. The longitudinal position is adjusted by means of adjust bolts 38 provided on the brackets 36 as shown in FIG. 12. An adjustment of the radial clearance between the rails and the barrel 2 of the RPV is made by means of adjust bolts 33 which are used in the temporary fixing of the rails.

(6) Further installation of additional vertical rails

Vertical rails 231 and 233 are secured to the turn tables 241 and 243. After the adjustment of position of the vertical rails, the supporting devices 26 and 29, rails 231 and 233 and the connecting bars 28 are fixed by welding. Each bolt is also welded so as to prevent the loosing thereof.

(7) Check of safe running of the rails

A test run of the inspection device along the rails is made to check a smooth running of the same after the adjust bolts are removed.

According to this installation method, it is possible to install the rail apparatus on the RPV in an ample space. In addition, the adjustment of the positions of the rails can be made almost perfectly before the mounting of the RPV in the containment vessel, so that the final adjustment made after the mounting of the RPV in the containment vessel is facilitated considerably. Furthermore, thanks to the increased accuracy or precision of the installation of the rail apparatus, the error of pitch of racks, formed on the rails for driving the inspection device, is diminished advantageously.

Although the invention has been described through specific terms, it is to be noted that the described embodiment is only illustrative and various changes and modifications may be imparted thereto without departing from the scope of the present invention which is limited solely by the appended claims.

What is claimed is:

1. A rail apparatus disposed around a nuclear pressure vessel for running an inspection device, comprising a plurality of circumferential rails spaced from each other, a plurality of turn tables, a first plurality of vertical rails connected to said circumferential rails through said turn tables to form a partial assembly of the rail apparatus, a second plurality of vertical rails connected to and extending upward from the uppermost circumferential rail through said turn tables, and supporting means through which said second plurality of vertical rails are attachable to a gamma shield for suspending said rail apparatus with said circumferential rails and vertical rails spaced outwardly and apart from the pressure vessel and for enabling said rail apparatus to be lifted together with said pressure vessel, and a swing prevention device positionable between said gamma shield and said rail apparatus.

2. A rail apparatus according to claim 1, wherein said rail apparatus as a whole is divided into an upper system and a lower system.

3. A rail apparatus according to claim 2, wherein mounting of said inspection device onto said upper system is made at one of said vertical rails extending upwardly from said uppermost circumferential rail.

4. A rail apparatus according to claim 2, wherein mounting of said inspection device onto said lower system is made at the turn table provided on a lowermost one of said circumferential rails.

5. A method of installing a rail apparatus around a nuclear pressure vessel comprising the steps: temporarily attaching circumferential rails to said pressure vessel before mounting said pressure vessel in a containment vessel; lifting and carrying said pressure vessel together with said circumferential rails into said containment vessel; and securing the rail apparatus including said circumferential rails to a gamma shield surrounding said pressure vessel.

6. A method of claim 5, wherein said step of temporarily attaching said circumferential rails to said pressure vessel is made by means of adjustable bolts provided on said circumferential rails.

7. A method of installing a rail apparatus around a nuclear pressure vessel comprising the steps: temporarily attaching circumferential rails to said pressure vessel before mounting said pressure vessel in a containment vessel; lifting and carrying said pressure vessel together with said circumferential rails into said containment vessel; placing said rails on temporary supporting brackets on a gamma shield and adjusting the position of said rails on said brackets; and securing said rails to said gamma shield by means of other supporting means.

8. A method of claim 7, wherein said step of temporarily attaching said circumferential rails is performed by adjusting bolts provided on said circumferential rails.

9. A method of installing a rail apparatus around a nuclear pressure vessel comprising the steps: forming a rail unit including at least two circumferential rails; temporarily attaching said rail unit to said pressure vessel before mounting said pressure vessel into a containment vessel; lifting and carrying said pressure vessel together with said rail unit into said containment vessel; attaching vertical rails to said rail units to form a whole assembly of the rail apparatus; and securing the whole assembly to said gamma shield.

10. A method of claim 9, further comprising interconnecting said two circumferential rails with axially oriented rails.

11. A method of claim 10, wherein said circumferential rails and said axially oriented rails are connected with each other through turn tables provided at every point of crossing between said circumferential rails and said axially oriented rails.

12. A method of claim 9, wherein the step of attaching the whole assembly to said gamma shield is performed by securing said axially oriented rails of said rail unit to said gamma shield through supporting means and by disposing swing prevention devices between said rail unit and said gamma shield.

* * * * *